(12) United States Patent
Yamamoto (10) Patent No.: US 9,988,087 B2
(45) Date of Patent: Jun. 5, 2018

(54) VEHICLE BODY SIDE STRUCTURE OF AUTOMOBILE

(71) Applicant: TOYOTA JIDOSHA KABUSHIKI KAISHA, Toyota-shi, Aichi-ken (JP)

(72) Inventor: Youhei Yamamoto, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 26 days.

(21) Appl. No.: 14/780,615

(22) PCT Filed: Mar. 26, 2013

(86) PCT No.: PCT/JP2013/058843
§ 371 (c)(1),
(2) Date: Sep. 28, 2015

(87) PCT Pub. No.: WO2014/155539
PCT Pub. Date: Oct. 2, 2014

(65) Prior Publication Data
US 2016/0052552 A1  Feb. 25, 2016

(51) Int. Cl.
*B62D 21/00* (2006.01)
*B62D 21/15* (2006.01)
*B62D 25/02* (2006.01)
*B62D 25/04* (2006.01)

(52) U.S. Cl.
CPC ......... *B62D 21/152* (2013.01); *B62D 25/025* (2013.01); *B62D 25/04* (2013.01)

(58) Field of Classification Search
CPC ..... B62D 21/152; B62D 25/025; B62D 25/04
See application file for complete search history.

(56) References Cited

U.S. PATENT DOCUMENTS

| 3,528,699 A * | 9/1970 | Wessells ............ B62D 25/2036 296/209 |
| 3,794,348 A * | 2/1974 | Fischer ................ B62D 21/152 188/371 |
| 4,944,553 A * | 7/1990 | Medley ................ B62D 25/025 296/203.03 |

(Continued)

FOREIGN PATENT DOCUMENTS

| DE | 10037494 A1 * | 3/2001 | ............. B62D 25/02 |
| DE | 10053332 A1 * | 5/2002 | ............. B62D 25/02 |

(Continued)

*Primary Examiner* — D Glenn Dayoan
*Assistant Examiner* — Paul Chenevert
(74) *Attorney, Agent, or Firm* — Oliff PLC (57) ABSTRACT

In a vehicle body side structure, an outer reinforcement lower is configured as a divided structure of a reinforcement body and a divided patch that are joined to each other at a joint portion located in a corner portion. Accordingly, when a load from a front wheel is input to a front pillar at the time of a small overlap collision, the outer reinforcement lower can be bent at the joint portion near the root of the outer reinforcement lower. Consequently, the bending moment that is transmitted to a rocker outer reinforcement can be reduced and therefore longitudinal bending deformation of the rocker outer reinforcement can be suppressed. As a result, deformation of a vehicle compartment can be suppressed.

6 Claims, 9 Drawing Sheets (56) References Cited

U.S. PATENT DOCUMENTS

| | | | | |
|---|---|---|---|---|
| 5,042,872 | A * | 8/1991 | Yoshii | B62D 25/025 296/203.02 |
| 6,293,617 | B1 * | 9/2001 | Sukegawa | B62D 25/025 296/203.02 |
| 6,315,353 | B1 * | 11/2001 | Brodt | B62D 25/02 296/203.03 |
| 6,824,204 | B2 * | 11/2004 | Gabbianelli | B62D 21/152 296/193.06 |
| 6,874,843 | B2 * | 4/2005 | Awano | B62D 21/152 296/187.09 |
| 6,929,314 | B2 * | 8/2005 | Hanyu | B62D 21/152 296/203.02 |
| 8,113,572 | B2 * | 2/2012 | Mildner | B62D 21/157 296/209 |
| 8,371,643 | B2 * | 2/2013 | Itakura | B62D 25/02 296/203.03 |
| 8,439,429 | B2 * | 5/2013 | Shida | B62D 25/025 296/187.12 |
| 8,585,134 | B2 * | 11/2013 | Yasui | B62D 21/152 296/204 |
| 8,662,575 | B2 * | 3/2014 | Tamura | B62D 25/025 296/209 |
| 8,690,227 | B2 * | 4/2014 | Matsuoka | B62D 21/155 296/187.09 |
| 8,857,894 | B2 * | 10/2014 | Grall | B60R 19/34 188/377 |
| 8,888,173 | B2 * | 11/2014 | Nydam | B62D 25/025 296/187.12 |
| 9,090,291 | B1 * | 7/2015 | Kanagai | B62D 25/04 |
| 9,108,680 | B2 * | 8/2015 | Suzuki | B62D 25/082 |
| 9,469,347 | B1 * | 10/2016 | Schnug | B62D 21/15 |
| 9,517,800 | B2 * | 12/2016 | Komamura | B62D 21/152 |
| 9,555,836 | B2 * | 1/2017 | Yamamoto | B62D 25/025 |
| 9,738,319 | B2 * | 8/2017 | Hasegawa | B62D 21/152 |
| 9,889,888 | B2 * | 2/2018 | Narahara | B62D 25/04 |
| 2012/0161475 | A1 * | 6/2012 | Mori | B62D 21/157 296/193.06 |
| 2013/0187406 | A1 * | 7/2013 | Torii | B62D 25/025 296/187.12 |
| 2015/0344071 | A1 * | 12/2015 | Nakano | B62D 25/04 296/187.09 |
| 2016/0039466 | A1 * | 2/2016 | Yamamoto | B62D 25/04 296/193.06 |
| 2016/0083015 | A1 * | 3/2016 | Kiyoshita | B62D 25/025 296/187.09 |
| 2016/0194031 | A1 * | 7/2016 | Yamamoto | B62D 25/025 296/187.1 |
| 2016/0257344 | A1 * | 9/2016 | Hasegawa | B62D 25/04 |
| 2016/0257345 | A1 * | 9/2016 | Hasegawa | B62D 25/025 |
| 2017/0050679 | A1 * | 2/2017 | Shirooka | B62D 25/04 |
| 2017/0203792 | A1 * | 7/2017 | Sunohara | B62D 21/157 |
| 2017/0313357 | A1 * | 11/2017 | Narahara | B62D 25/04 |
| 2017/0313358 | A1 * | 11/2017 | Narahara | B62D 25/04 |

FOREIGN PATENT DOCUMENTS

| | | | | |
|---|---|---|---|---|
| DE | 10240474 | A1 * | 3/2004 | B62D 21/02 |
| DE | 102004019820 | A1 * | 11/2005 | B62D 23/005 |
| DE | 102008056507 | A1 * | 5/2010 | B62D 25/02 |
| DE | 102012016388 | A1 * | 3/2013 | B62D 25/025 |
| DE | 102013214772 | A1 * | 1/2015 | B62D 21/15 |
| EP | 2055614 | A1 * | 5/2009 | B62D 25/025 |
| FR | 2926056 | A1 * | 7/2009 | B62D 21/152 |
| JP | 2000-272538 | A | 10/2000 | |
| JP | 2009-061991 | A | 3/2009 | |
| JP | WO 2012153425 | A1 * | 11/2012 | B62D 25/04 |
| JP | WO 2015118852 | A1 * | 8/2015 | B62D 25/025 |

* cited by examiner

VEHICLE BODY SIDE STRUCTURE OF AUTOMOBILE

TECHNICAL FIELD

The present invention relates to a vehicle body side structure of an automobile.

BACKGROUND ART

In a vehicle body side structure of an automobile described in Japanese Patent Application Publication No. 2000-272538, a side body includes an inner panel and a side body outer panel. A first reinforcement (front pillar outer reinforcement) for reinforcing a front pillar is disposed in the side body at a front pillar portion thereof. A lower end portion of the front pillar outer reinforcement extends toward a vehicle rear side and is joined to a front end portion of a side sill reinforcement (rocker outer reinforcement) provided at a side sill portion (rocker portion).

As another prior art document related to the present application invention, there is Japanese Patent Application Publication No. 2009-61991.

SUMMARY OF THE INVENTION

Problem to be Solved by the Invention

In the meantime, when a vehicle width direction outer side portion relative to a front side member at a front portion of an automobile collides head-on with another vehicle or the like (at the time of a so-called small overlap collision), collision energy cannot be absorbed by deformation of the front side member. In such a case, an excessive load from a front wheel moving rearward toward the front pillar side may possibly be input to a front pillar so that the front pillar may fall toward the vehicle rear side to cause longitudinal bending deformation of a rocker joined to a lower end portion of the front pillar. If such longitudinal bending deformation of the rocker becomes dominant, a flange joint portion at an upper portion of the rocker is broken so that the amount of deformation of the rocker increases due to the development of such breakage. As a result, the amount of deformation of a vehicle compartment increases.

In consideration of the above-mentioned fact, it is an object of the present invention to obtain a vehicle body side structure of an automobile capable of suppressing deformation of a vehicle compartment at the time of a small overlap collision.

Means for Solving the Problem

A vehicle body side structure of an automobile in a first aspect of the present invention includes: a rocker outer reinforcement formed in an elongated shape extending in a longitudinal direction of a rocker and configured to reinforce the rocker; and a front pillar outer reinforcement including a reinforcement body formed in an elongated shape extending in a longitudinal direction of a front pillar and configured to reinforce the front pillar, wherein a divided patch joined to a lower end portion of the reinforcement body is joined to a front end portion of the rocker outer reinforcement, wherein a rearward extending portion extending toward a vehicle rear side is formed by the lower end portion of the reinforcement body and the divided patch, wherein an upper portion of the rearward extending portion is configured as a corner portion of an arc shape in side view, and wherein a joint portion between the reinforcement body and the divided patch is provided in the corner portion.

In the first aspect, when a load from a front wheel moving rearward due to a small overlap collision is input to the front pillar, it is possible to concentrate the stress on the joint portion between the reinforcement body and the divided patch in the front pillar outer reinforcement. Since this joint portion is provided in the corner portion at the upper portion of the rearward extending portion provided at the lower end portion of the front pillar outer reinforcement, the front pillar outer reinforcement is deformed at the joint portion so that it is possible to bend the front pillar outer reinforcement near its root. Consequently, the bending moment that is transmitted to the rocker outer reinforcement via the divided patch can be reduced so that it is possible to prevent or effectively suppress longitudinal bending deformation of the rocker outer reinforcement. As a result, deformation of a vehicle compartment can be suppressed.

A vehicle body side structure of an automobile in a second aspect of the present invention is configured such that, in the first aspect, the lower end portion of the reinforcement body overlaps a vehicle body outer side of the divided patch at the joint portion between the reinforcement body and the divided patch.

In the second aspect, configured as described above, when the reinforcement body of the front pillar outer reinforcement falls toward the vehicle rear side due to a load from the front wheel, it is possible to prevent the divided patch from accidentally interfering with the reinforcement body from the vehicle body outer side. Consequently, it is possible to effectively suppress transmission of a load from the reinforcement body to the rocker outer reinforcement via the divided patch.

A vehicle body side structure of an automobile in a third aspect of the present invention is configured such that, in the first or second aspect, the divided patch is disposed in a state of straddling a rear end of the corner portion.

In the third aspect, configured as described above, it is possible to prevent or effectively suppress accidental breakage of a joint portion between the divided patch and the rocker outer reinforcement. That is, when a load from the vehicle front side is input to the front pillar outer reinforcement, the stress is concentrated on the joint portion, provided in the corner portion, between the reinforcement body and the divided patch. Since the divided patch is disposed so as to straddle the rear end, away from this stress concentrated portion, of the corner portion, it is possible to reduce a load that is applied to the joint portion between the divided patch and the rocker outer reinforcement. Consequently, the effect described above can be obtained.

A vehicle body side structure of an automobile in a fourth aspect of the present invention is configured such that, in any one of the first to third aspects, the divided patch includes an outer wall portion joined to a side wall portion of the reinforcement body, an upper wall portion extending inward in a vehicle width direction from an upper end of the outer wall portion and joined to a rear wall portion of the reinforcement body, and an inner wall portion extending upward from an inner end in the vehicle width direction of the upper wall portion and joined to a rear flange of the reinforcement body.

In the fourth aspect, since the divided patch is configured as described above, the divided patch can be easily manufactured by bending a metal plate material into a crank shape in cross section.

Effects of the Invention

As described above, with a vehicle body side structure of an automobile according to the present invention, it is possible to suppress deformation of a vehicle compartment at the time of a small overlap collision.

MODES FOR CARRYING OUT THE INVENTION

First Embodiment

A vehicle body side structure 10 of an automobile according to a first embodiment of the present invention will be described with reference to FIGS. 1 to 9. An arrow FR, an arrow UP, and an arrow OUT shown in the figures as appropriate respectively indicate a vehicle forward direction (travel direction), a vehicle upward direction, and an outer side in a vehicle width direction. Hereinbelow, when a description is given using a direction of merely forward or rearward or a direction of merely upward or downward, it indicates forward or rearward in a vehicle front-rear direction or upward or downward in a vehicle up-down direction unless otherwise stated.

(Configuration)

Figure 1:
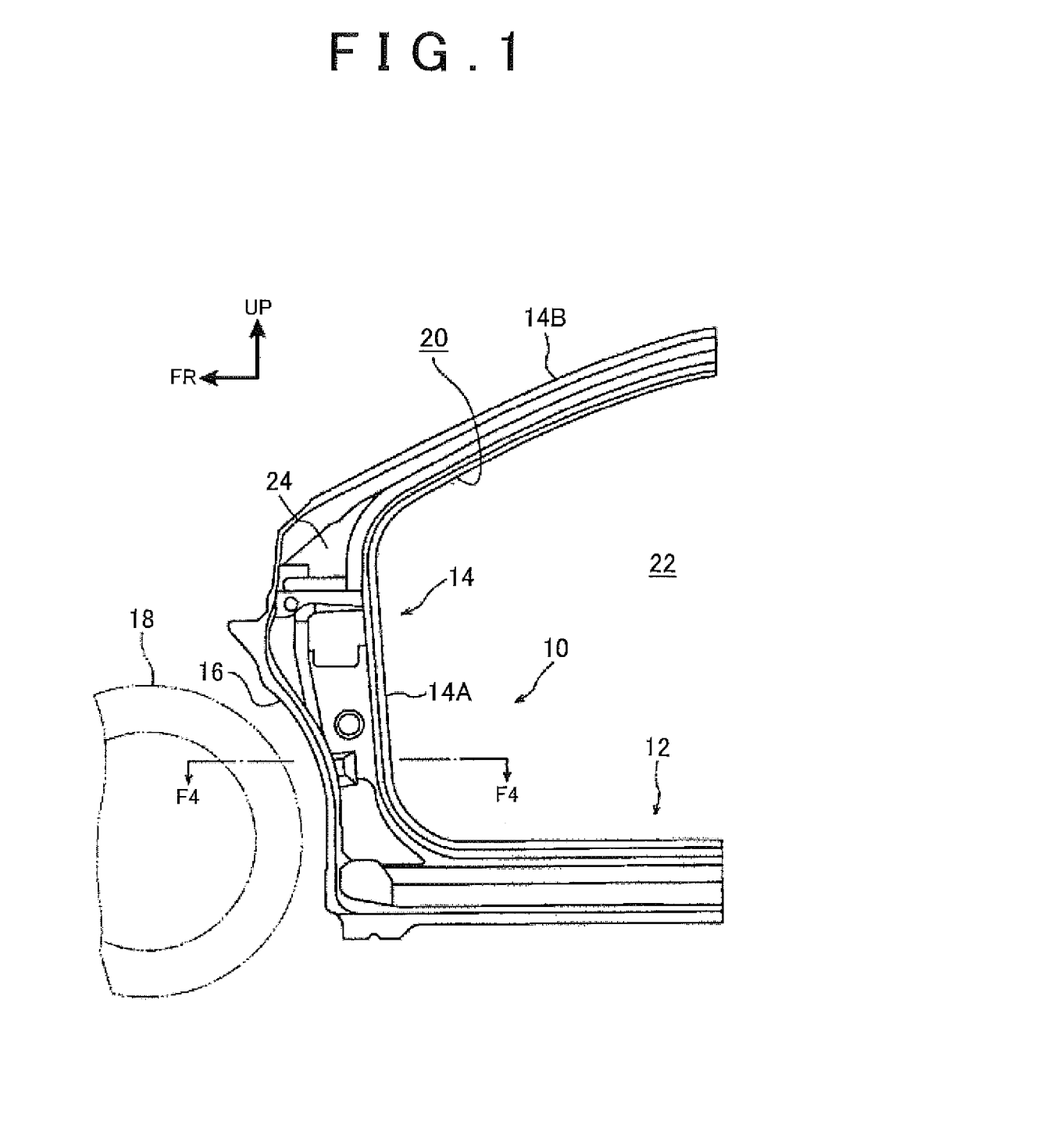
FIG. 1 is a side view of a vehicle body side portion to which a vehicle body side structure of an automobile according to an embodiment of the present invention is applied.

As shown in FIG. 1, the vehicle body side structure 10 includes a rocker 12 extending in the vehicle front-rear direction on each of both sides at lower portions of a vehicle body and a front pillar 14 joined to a front end portion of the rocker 12. The front pillar 14 includes a front pillar lower 14A extending in the vehicle upward direction from the front end portion of the rocker 12 and a front pillar upper 14B extending obliquely upward in the vehicle rear direction from an upper end portion of the front pillar lower 14A. A wheel house 16 is formed on the vehicle front side of the front pillar lower 14A and a front wheel 18 is disposed in the wheel house 16.

The rocker 12 and the front pillar 14 are closed cross-sectional members constituting a skeleton of the vehicle body and form, jointly with a roof side rail and a center pillar (B-pillar), not shown, a door opening portion 20 for an occupant to get on and off. The door opening portion 20 is formed at a side portion of a vehicle compartment 22 and configured to be opened and closed by a side door not shown.

Outer walls at an outer end in the vehicle width direction of the rocker 12 and the front pillar 14 are formed by a common side outer panel 24 which is a large pressed component. Although not shown, the rocker 12 and the roof side rail extend to a rear pillar (C-pillar).

Figure 2:
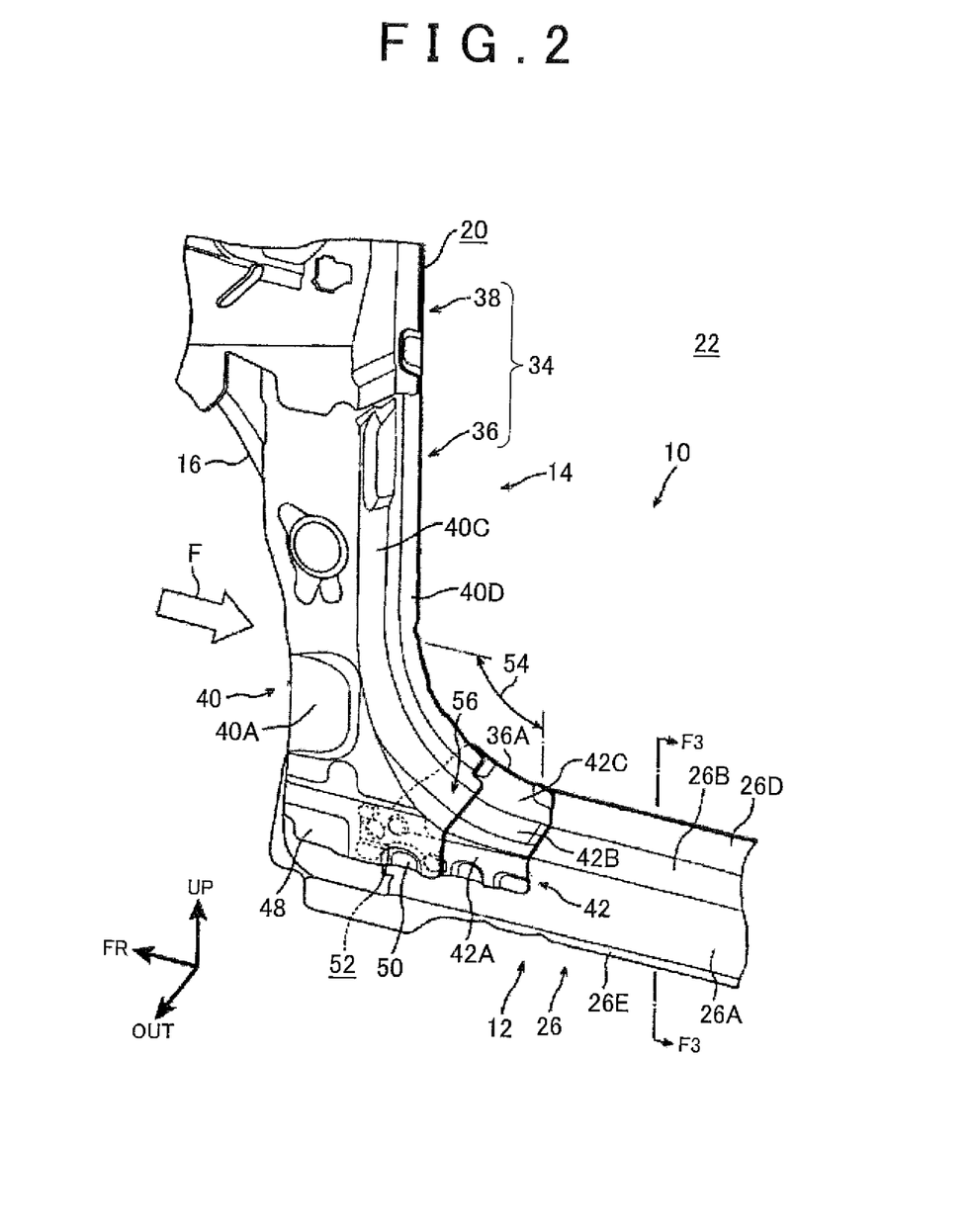
FIG. 2 is a perspective view showing a configuration around a joint portion between a rocker and a front pillar as seen from a vehicle body outer side with a side outer panel omitted.
Figure 3:
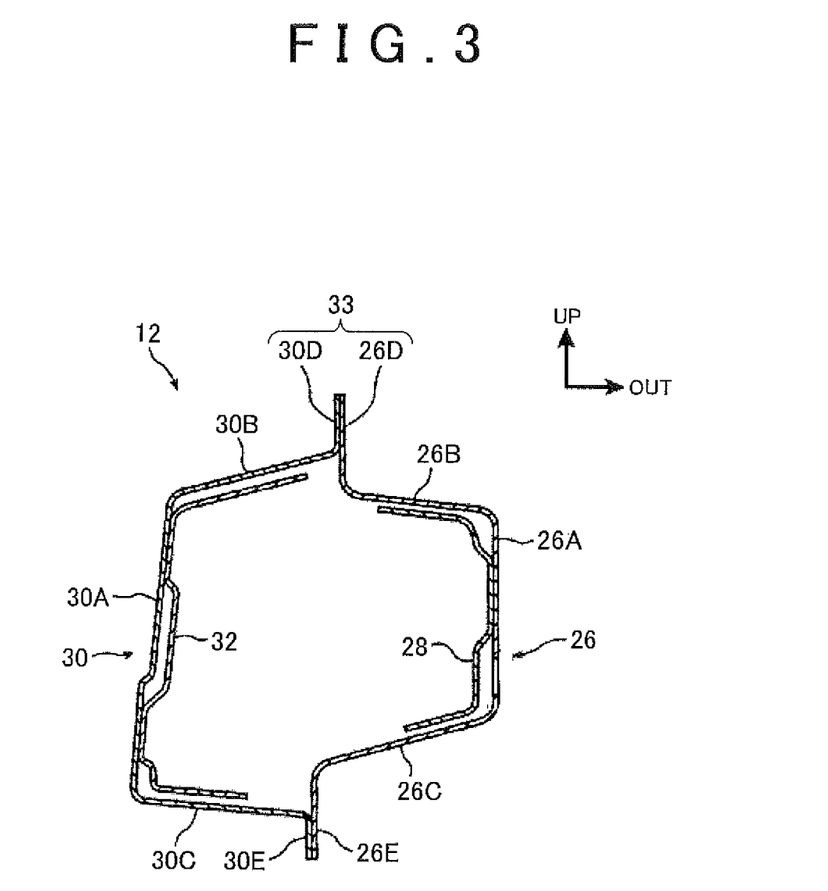
FIG. 3 is an enlarged cross-sectional view showing in an enlarged scale a cross section taken along line F3-F3 of FIG. 2.

FIG. 2 shows, in a perspective view, a configuration around a joint portion between the rocker 12 and the front pillar 14 as seen from the vehicle body outer side with the side outer panel 24 omitted. As shown in FIG. 2, the rocker 12 includes a rocker outer reinforcement 26. The rocker outer reinforcement 26 is a high-strength metal plate member that is formed in an elongated shape extending in a longitudinal direction of the rocker 12 and configured to reinforce the rocker 12. As shown in FIG. 3, the rocker outer reinforcement 26 has a hat-shaped cross section that is open inward in the vehicle width direction as seen from the vehicle front-rear direction.

Specifically, the rocker outer reinforcement 26 is configured such that an upper wall portion 26B and a lower wall portion 26C extend inward in the vehicle width direction from vehicle upper and lower ends of a side wall portion 26A and that an upper flange 26D and a lower flange 26E project from inner ends in the vehicle width direction of the upper wall portion 26B and the lower wall portion 26C. A reinforcing plate 28 having a hat-shaped cross section that is open inward in the vehicle width direction as seen from the vehicle front-rear direction is joined to the inner side of the rocker outer reinforcement 26.

A rocker inner panel 30 is provided on the inner side in the vehicle width direction of the rocker outer reinforcement 26. The rocker inner panel 30 is a metal plate member forming an inner side portion in the vehicle width direction of the rocker 12 and has a hat-shaped cross section that is open outward in the vehicle width direction as seen from the vehicle front-rear direction. Specifically, the rocker inner panel 30 is configured such that an upper wall portion 30B and a lower wall portion 30C extend outward in the vehicle width direction from vehicle upper and lower ends of a side wall portion 30A and that an upper flange 30D and a lower flange 30E project from inner ends in the vehicle width direction of the upper wall portion 30B and the lower wall portion 30C. A reinforcing plate 32 having a hat-shaped cross section that is open outward in the vehicle width direction as seen from the vehicle front-rear direction is joined to the inner side of the rocker inner panel 30.

The rocker outer reinforcement 26 and the rocker inner panel 30 described above are configured such that the upper flanges 26D and 30D are overlapped and joined together by a means such as spot welding and that the lower flanges 26E and 30E are overlapped and joined together by a means such as spot welding. Consequently, a closed cross section is formed by the rocker outer reinforcement 26 and the rocker inner panel 30. In FIG. 3, the side outer panel 24 is not shown. In the following description, a joint portion between the upper flange 26D and the upper flange 30D will be referred to as an "opening flange 33".

On the other hand, as shown in FIG. 2, the front pillar 14 includes a front pillar outer reinforcement 34. The front pillar outer reinforcement 34 is a high-strength metal plate member that is formed in an elongated shape extending in a longitudinal direction of the front pillar 14 and configured to reinforce the front pillar 14. The front pillar outer reinforcement 34 includes an outer reinforcement lower 36 and an outer reinforcement upper 38. A lower end portion of the outer reinforcement upper 38 overlaps an upper end portion of the outer reinforcement lower 36 and both are joined together by a means such as spot welding.

Main Portion of this Embodiment

Figure 4:
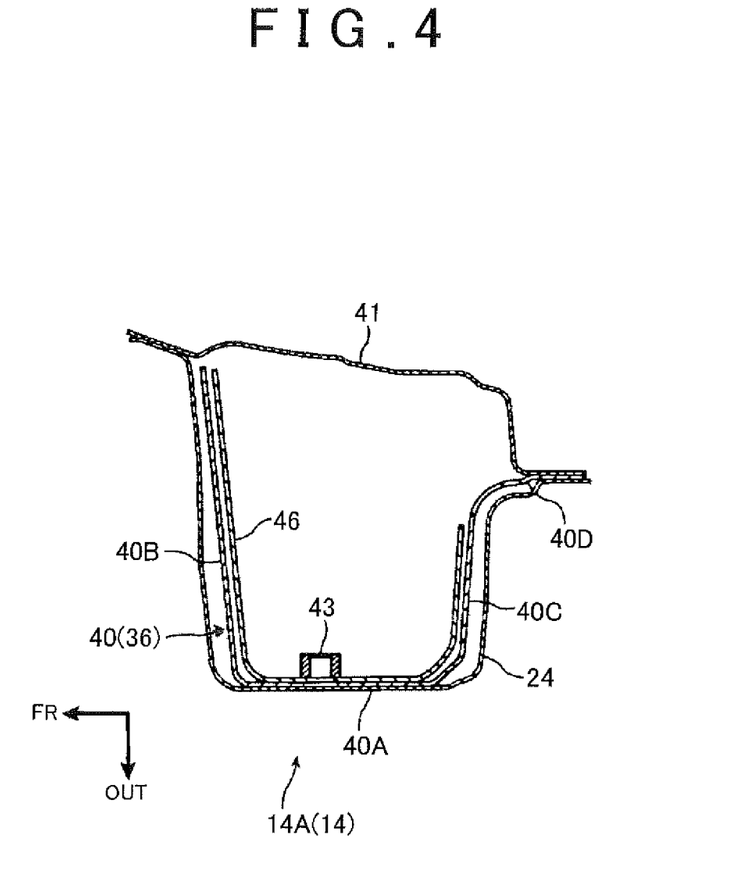
FIG. 4 is an enlarged cross-sectional view showing in an enlarged scale a cross section taken along line F4-F4 of FIG. 1.
Figure 5:
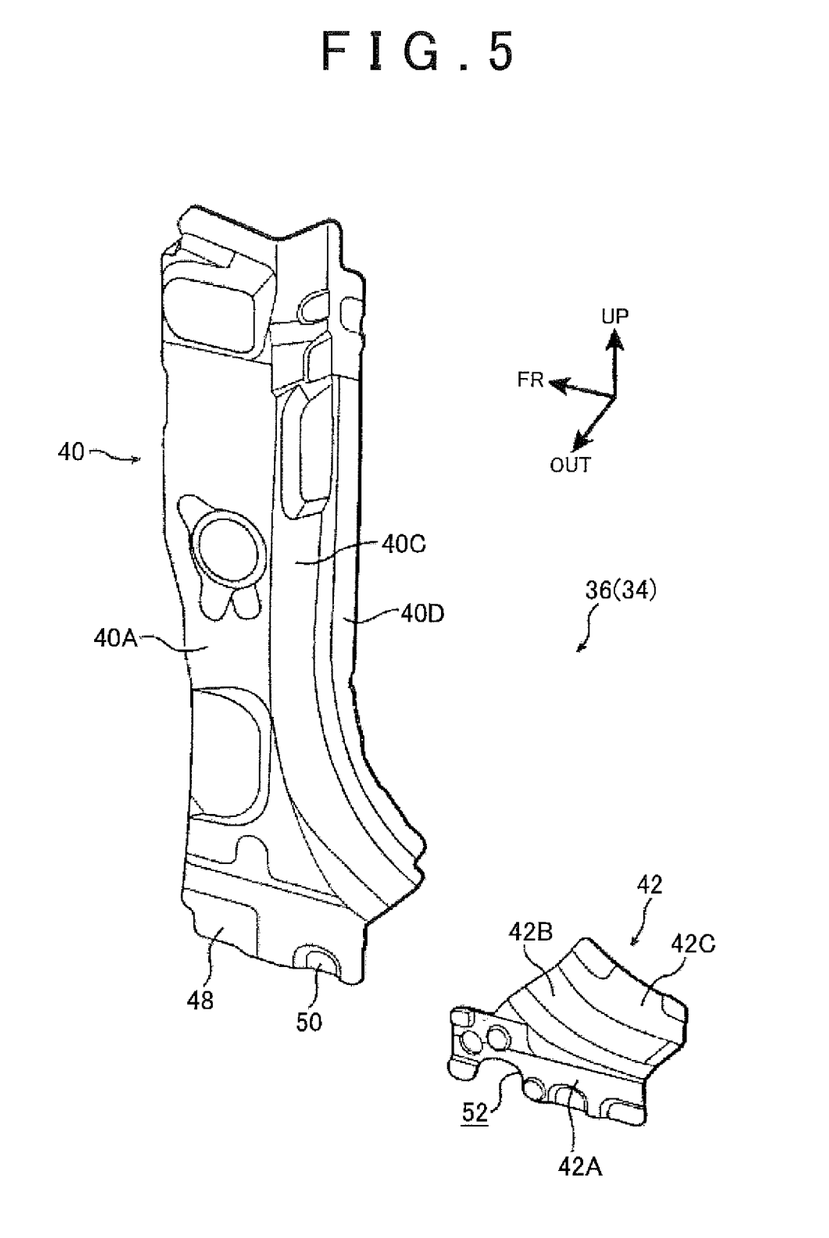
FIG. 5 is an exploded perspective view of an outer reinforcement lower.

Herein, in this embodiment, as shown in FIGS. 2 and 5, the outer reinforcement lower 36 is configured as a divided structure formed by joining a reinforcement body 40 and a divided patch 42 to each other. The reinforcement body 40 is formed in an elongated shape extending in a longitudinal direction of the front pillar lower 14A and, as shown in FIG. 4, has a hat-shaped cross section that is open inward in the vehicle width direction as seen from the vehicle up-down direction.

Specifically, the reinforcement body 40 is configured such that a front wall portion 40B and a rear wall portion 40C extend inward in the vehicle width direction from vehicle front and rear ends of a side wall portion 40A and that a front flange (not shown) and a rear flange 40D project from inner ends in the vehicle width direction of the front wall portion 40B and the rear wall portion 40C. The front flange and the rear flange 40D of the reinforcement body 40 are sandwiched between the side outer panel 24 and a front pillar inner panel 41 and joined thereto by a means such as spot welding. The front flange of the reinforcement body 40 is provided in a cross section different from that of FIG. 4.

In the reinforcement body 40, as shown in FIGS. 2 and 5, a lower portion of a rear end edge of the side wall portion 40A and a lower portion of the rear wall portion 40C are curved toward the vehicle rear side as going downward so that the size in the vehicle front-rear direction of the reinforcement body 40 is increased on the lower portion side thereof. As shown in FIG. 4, a reinforcing plate 46 (hinge reinforcement) having a hat-shaped cross section that is open inward in the vehicle width direction as seen from the vehicle up-down direction is joined to the inner side of the reinforcement body 40. A member denoted by symbol 43 in FIG. 4 is a nut for fastening a hinge of the side door to the front pillar 14.

On the other hand, the divided patch 42 is a high-strength member made of a metal plate material having a plate thickness equal to that of the reinforcement body 40. As shown in FIGS. 2 and 5, the divided patch 42 includes an outer wall portion 42A disposed on the outer side in the vehicle width direction of the side wall portion 26A of the rocker outer reinforcement 26, an upper wall portion 42B extending inward in the vehicle width direction from an upper end of the outer wall portion 42A, and an inner wall portion 42C extending upward from an inner end in the vehicle width direction of the upper wall portion 42B.

The outer wall portion 42A overlaps an outer surface in the vehicle width direction of the side wall portion 26A of the rocker outer reinforcement 26 and is joined to the side wall portion 26A by a means such as spot welding. The upper wall portion 42B overlaps an upper surface of the upper wall portion 26B of the rocker outer reinforcement 26 and is joined to the upper wall portion 26B by a means such as spot welding. The inner wall portion 42C overlaps an outer surface in the vehicle width direction of the upper flange 26D of the rocker outer reinforcement 26 so that the inner wall portion 42C, the upper flange 26D, and the upper flange 30D of the rocker inner panel 30 are joined together in three plies by a means such as spot welding.

The shape of the divided patch 42 is set so as to be integrally continuous with a lower end portion of the reinforcement body 40. Specifically, in the divided patch 42, a front portion of an upper end edge of the outer wall portion 42A and a front portion of the upper wall portion 42B are curved upward as going toward the vehicle front side so that the size in the vehicle up-down direction of the divided patch 42 is increased on the front portion side thereof. As shown in FIG. 2, a rear portion of the lower end portion of the reinforcement body 40 overlaps the front portion of the divided patch 42 on the vehicle body outer side (on the side opposite to the rocker 12) so that the front portion of the divided patch 42 is covered by the rear portion of the lower end portion of the reinforcement body 40 from the vehicle body outer side.

A front portion of the outer wall portion 42A of the divided patch 42 protrudes to the vehicle front side relative to the upper wall portion 42B and the inner wall portion 42C and overlaps an inner surface in the vehicle width direction of the side wall portion 40A of the reinforcement body 40. This front portion of the outer wall portion 42A is joined to the side wall portion 40A by a means such as spot welding. The front portion of the upper wall portion 42B overlaps a lower surface of the rear wall portion 40C of the reinforcement body 40 and is joined to the rear wall portion 40C by a means such as spot welding. Further, a front portion of the inner wall portion 42C overlaps an inner surface in the vehicle width direction of the rear flange 40D of the reinforcement body 40 and is joined to the rear flange 40D by a means such as spot welding. Consequently, the reinforcement body 40 is joined to the divided patch 42, and the reinforcement body 40 and the rocker outer reinforcement 26 are joined to each other via the divided patch 42.

A pair of front and rear bulging portions 48 and 50 bulging toward the inner side in the vehicle width direction are formed at a lower end portion of the side wall portion 40A of the reinforcement body 40. The front bulging portion 48 overlaps an outer surface in the vehicle width direction of the side wall portion 26A of the rocker outer reinforcement 26 and is joined to the side wall portion 26A by a means such as spot welding. The rear bulging portion 50 is provided at a position overlapping a front portion of the outer wall portion 42A of the divided patch 42. This front portion of the outer wall portion 42A is formed, at a position facing the bulging portion 50, with a cutout portion 52 cut from a lower end of the outer wall portion 42A. The side wall portion 26A is exposed to the bulging portion 50 side via the cutout portion 52 so that the bulging portion 50 overlaps this exposed portion and is joined to the side wall portion 26A by a means such as spot welding. At these bulging portions 48 and 50, the reinforcement body 40 is directly joined to the rocker outer reinforcement 26.

In the outer reinforcement lower 36 configured as described above, as shown in FIG. 2, a rearward extending portion 36A (extension portion) extending toward the vehicle rear side is formed by the lower end portion of the reinforcement body 40 and the divided patch 42. An upper portion of the rearward extending portion 36A is configured as an arc-shaped corner portion 54 which is convex toward the vehicle front side and the vehicle lower side in side view.

In this embodiment, a joint portion 56 between the reinforcement body 40 and the divided patch 42 (a division line of the outer reinforcement lower 36) is provided near a middle portion in a curving direction of the corner portion 54. Further, in this embodiment, the divided patch 42 is disposed in a state of straddling a rear end of the corner portion 54, i.e. in a state where a rear end portion of the divided patch 42 protrudes to the vehicle rear side relative to the rear end of the corner portion 54. The position of the joint portion 56 is not limited to that described above and can be appropriately changed in a range of the corner portion 54.

(Actions and Effects)

Next, the actions and effects of this embodiment will be described.

In the vehicle body side structure 10 of the automobile configured as described above, when a load F (see FIG. 2) from the front wheel 18 moving rearward due to a small overlap collision is input to the front pillar 14, it is possible to concentrate the stress on the joint portion 56 between the reinforcement body 40 and the divided patch 42 in the front pillar outer reinforcement 34. Since the joint portion 56 is provided in the corner portion 54 at the upper portion of the rearward extending portion 36A of the front pillar outer reinforcement 34, the front pillar outer reinforcement 34 is deformed at the joint portion 56 so that it is possible to bend the front pillar outer reinforcement 34 (i.e. the front pillar 14) near its root. Consequently, the bending moment that is transmitted to the rocker outer reinforcement 26 via the divided patch 42 can be reduced so that it is possible to prevent or effectively suppress longitudinal bending deformation of the rocker 12. As a result, deformation of the vehicle compartment 22 can be suppressed.

Figure 6A:
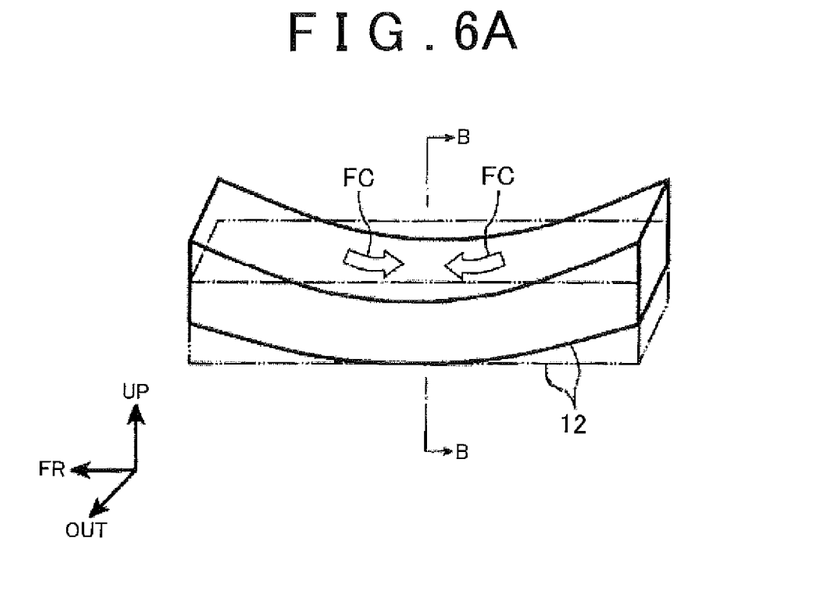
FIG. 6A-B (A) is an exemplary diagram showing a state where the rocker is subjected to longitudinal bending deformation, and (B) is an exemplary diagram showing in an enlarged scale a cross section taken along line B-B of (A).
Figure 6B:
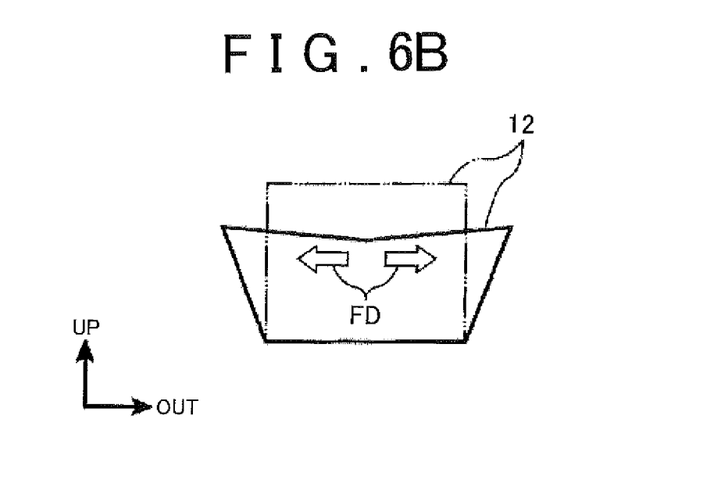
Figure 7A:
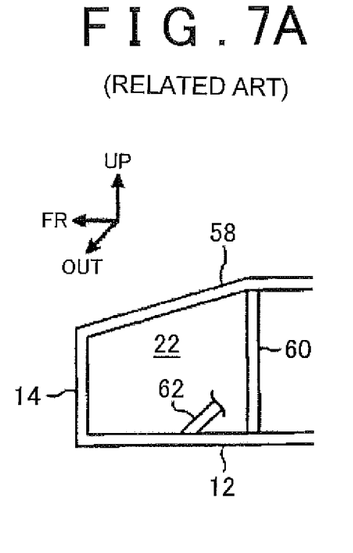
FIG. 7A-B (A) is a perspective view exemplarily showing a vehicle body side structure according to a comparative example (related art), and (B) is a perspective view exemplarily showing a state where a rocker is bent due to input of a load from a front wheel to a front pillar in the vehicle body side structure.
Figure 7B:
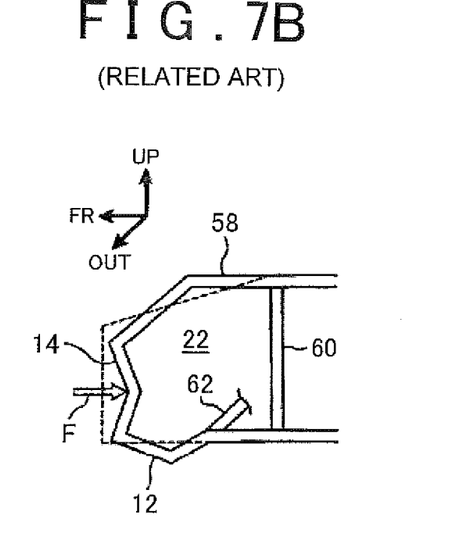

That is, as exemplarily shown in FIG. 6(A), when the rocker 12 is subjected to longitudinal bending deformation, compressive loads FC directed toward a maximum bent portion side of the rocker 12 act on the upper portion side, which is a concave side of the longitudinal bending deformation, of the rocker 12. When a cross section of the rocker 12 is vertically squashed due to the compressive loads FC as shown in FIG. 6(B), the width dimension of the rocker 12 on the upper portion side thereof increases in order to maintain the line length (peripheral length) of the cross section. As a result, separation loads FD along the vehicle width direction act on the opening flange 33 (see FIG. 3: not shown in FIG. 6(A) and FIG. 6(B)) at the upper portion of the rocker 12. If a joint point of the opening flange 33 is broken due to the separation loads FD and if this breakage is developed, the rocker 12 is bent downward near the broken portion so that the amount of deformation of the rocker 12 increases (see a comparative example shown in FIG. 7(A) and FIG. 7(B)). As a result, deformation of the vehicle compartment 22 increases. In FIG. 7(A) and FIG. 7(B), a member denoted by symbol 58 is a roof side rail, a member denoted by symbol 60 is a center pillar, and a member denoted by symbol 62 is a first floor cross member (the same shall apply to FIG. 8(A) and FIG. 8(B)).

Figure 8A:
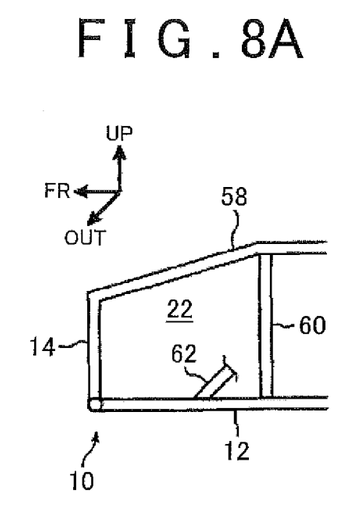
FIG. 8A-B (A) is a perspective view exemplarily showing the vehicle body side structure according to this embodiment, and (B) is a perspective view exemplarily showing a state where the front pillar is bent near its root due to input of a load from a front wheel to the front pillar in the vehicle body side structure.
Figure 8B:
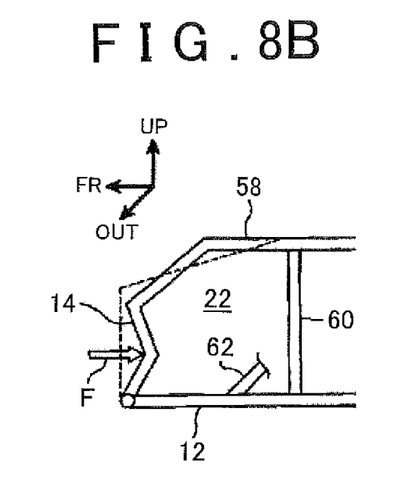
Figure 9:
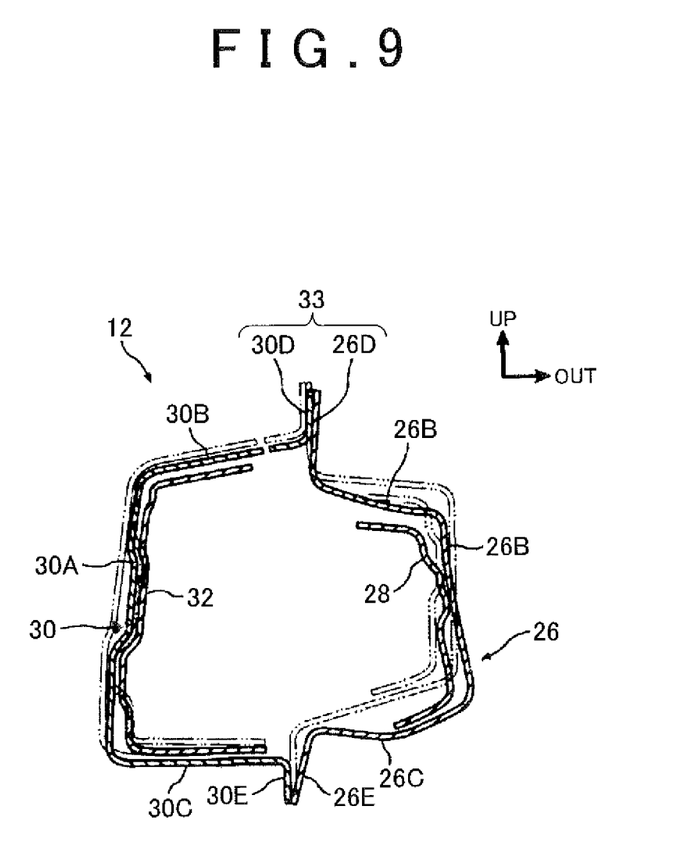
FIG. 9 is a cross-sectional view, corresponding to FIG. 3, for explaining a state where breakage of an opening flange of the rocker is prevented by suppression of longitudinal bending deformation of the rocker in the vehicle body side structure according to this embodiment.

On the other hand, in this embodiment, the lower end portion of the front pillar 14 is pin-joint (see exemplary diagrams shown in FIG. 8(A) and FIG. 8(B)) by the divided structure of the reinforcement body 40 and the divided patch 42. Consequently, as described above, since the front pillar 14 can be bent near its root due to the load F from the front wheel 18, the bending moment that is transmitted to the rocker outer reinforcement 26 can be reduced so that it is possible to prevent or effectively suppress longitudinal bending deformation of the rocker 12 (see FIG. 8(B)). As a result, as shown in FIG. 9, it is possible to prevent or effectively suppress breakage of the opening flange 33 of the rocker 12 so that the amount of deformation of the rocker 12 can be reduced. In FIG. 9, a state before deformation of the rocker 12 is shown by two-dot chain lines, while a state after deformation of the rocker 12 is shown by solid lines.

Further, in this embodiment, the lower end portion of the reinforcement body 40 overlaps the vehicle body outer side of the divided patch 42 at the joint portion 56 between the reinforcement body 40 and the divided patch 42. Accordingly, when the reinforcement body 40 falls toward the vehicle rear side due to the load F from the front wheel 18, it is possible to prevent the divided patch 42 from accidentally interfering with the reinforcement body 40 from the vehicle body outer side. Consequently, it is possible to effectively suppress transmission of a load from the reinforcement body 40 to the rocker outer reinforcement 26 via the divided patch 42.

Further, in this embodiment, the divided patch 42 is disposed in the state of straddling the rear end of the corner portion 54. Accordingly, it is possible to prevent or effectively suppress accidental breakage of the joint portion between the divided patch 42 and the rocker outer reinforcement 26. That is, when the load F from the front wheel 18 is input to the front pillar 14, the stress is concentrated on the joint portion 56 provided in the corner portion 54. Since the divided patch 42 is disposed so as to straddle the rear end, away from this stress concentrated portion, of the corner portion 54, it is possible to reduce a load that is applied to the joint portion between the divided patch 42 and the rocker outer reinforcement 26. Consequently, the effect described above can be obtained.

Further, in this embodiment, the divided patch 42 includes the outer wall portion 42A, the upper wall portion 42B extending inward in the vehicle width direction from the upper end of the outer wall portion 42A, and the inner wall portion 42C extending upward from the inner end in the vehicle width direction of the upper wall portion 42B. Accordingly, the divided patch 42 can be easily manufactured by bending the metal plate material into a crank shape in cross section.

Further, in this embodiment, since the reinforcement body 40 and the divided patch 42 are divided near the middle portion in the curving direction of the corner portion 54 of the outer reinforcement lower 36, it is possible to improve the formability of the reinforcement body 40 and the divided patch 42. That is, in the case where the outer reinforcement lower 36 is not configured as the divided structure differently from this embodiment, it may possibly be difficult to improve the formation accuracy of the corner portion 54 when press-forming the high-strength metal plate material into the outer reinforcement lower 36. In this regard, according to the divided structure of this embodiment, it is possible to easily improve the formation accuracy of the constituent portions of the corner portion 54 in the reinforcement body 40 and the divided patch 42.

While the present invention has been described with reference to the embodiment, the present invention can be carried out with various changes within a range not departing from the gist thereof. Naturally, the scope of rights of the present invention is not limited to the above-described embodiment.

The invention claimed is:

1. A vehicle body side structure of an automobile, comprising:

a rocker outer reinforcement formed in an elongated shape extending in a longitudinal direction of a rocker and configured to reinforce the rocker; and a front pillar outer reinforcement including a reinforcement body formed in an elongated shape extending in a longitudinal direction of a front pillar and configured to reinforce the front pillar, wherein a divided patch is joined to a front end portion of the rocker outer reinforcement and joined to a lower end portion of the reinforcement body, wherein a rearward extending portion extending toward a vehicle rear side is formed by the lower end portion of the reinforcement body and the divided patch, wherein an upper portion of the rearward extending portion is configured as a corner portion of an arc shape in side view, and wherein a joint portion between the reinforcement body and the divided patch is provided in the corner portion, wherein the lower end portion of the reinforcement body overlaps a vehicle body outer side of the divided patch at the joint portion between the reinforcement body and the divided patch, the divided patch overlaps a vehicle body outer side of the front end portion of the rocker outer reinforcement, and a vehicle front-most edge of the divided patch extends only to a point in a forward direction corresponding to a point at which a vehicle front-most side of the arc shape of the corner portion is located in the longitudinal direction of the rocker.

2. A vehicle body side structure of an automobile, comprising:

a rocker outer reinforcement formed in an elongated shape extending in a longitudinal direction of a rocker and configured to reinforce the rocker; and a front pillar outer reinforcement including a reinforcement body formed in an elongated shape extending in a longitudinal direction of a front pillar and configured to reinforce the front pillar, wherein a divided patch is joined to a front end portion of the rocker outer reinforcement and joined to a lower end portion of the reinforcement body, wherein a rearward extending portion extending toward a vehicle rear side is formed by the lower end portion of the reinforcement body and the divided patch, wherein an upper portion of the rearward extending portion is configured as a corner portion of an arc shape in side view, and wherein a joint portion between the reinforcement body and the divided patch is provided in the corner portion, wherein the lower end portion of the reinforcement body overlaps a vehicle body outer side of the divided patch at the joint portion between the reinforcement body and the divided patch, the divided patch overlaps a vehicle body outer side of the front end portion of the rocker outer reinforcement, a vehicle front-most edge of the divided patch extends only to a point in a forward direction corresponding to a point at which a vehicle front-most side of the arc shape of the corner portion is located in the longitudinal direction of the rocker, and the divided patch includes an upper wall portion joined to a rear wall portion of the reinforcement body, a vehicle front-most side of the upper wall portion being disposed on the arc shape of the corner portion.

3. The vehicle body side structure according to claim 2, wherein the divided patch is disposed in a state of straddling a rear end of the corner portion.

4. The vehicle body side structure according to claim 2, wherein the divided patch includes an outer wall portion joined to a side wall portion of the reinforcement body, the upper wall portion extending inward in a vehicle width direction from an upper end of the outer wall portion, and an inner wall portion extending upward from an inner end in the vehicle width direction of the upper wall portion and joined to a rear flange of the reinforcement body.

5. The vehicle body side structure according to claim 2, wherein the reinforcement body is configured such that a front wall portion and the rear wall portion extend inward in the vehicle width direction from vehicle front and rear ends of a side wall portion and that a front flange and a rear flange project from inner ends in the vehicle width direction of the front wall portion and the rear wall portion.

6. The vehicle body side structure according to claim 2, wherein the vehicle front-most side of the upper wall portion is disposed on the arc shape of the corner portion at a point offset from a vehicle front-most side of the front pillar in the longitudinal direction of the rocker by at least a width of a main portion of the reinforcement body.

* * * * *